Sept. 5, 1961  A. A. MEISTER  2,999,042
METHOD OF PRODUCING PLASTIC SEAM
Filed Oct. 1, 1956
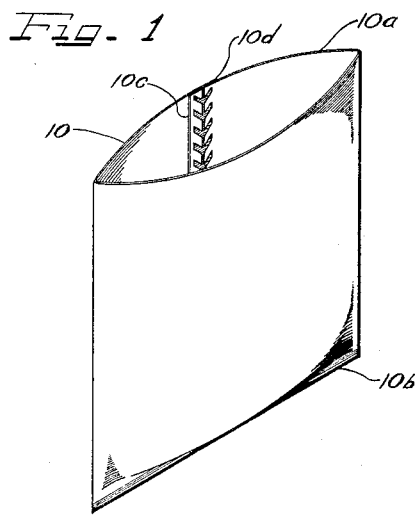
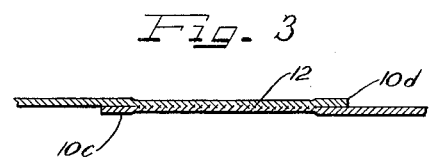
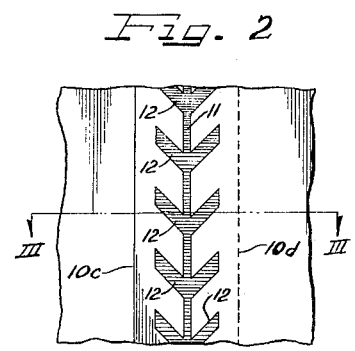
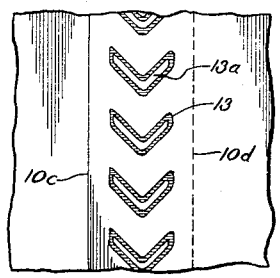
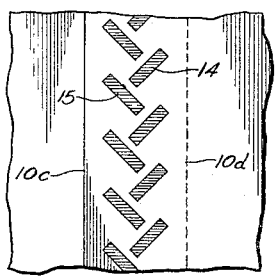
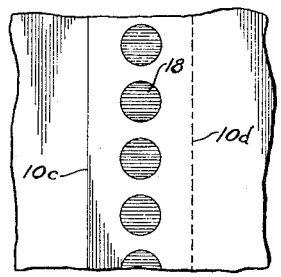
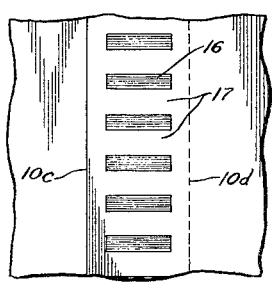
Inventor
ALBERT A. MEISTER
By Hill, Sherman, Meroni, Gross & Simpson
Attys

United States Patent Office 2,999,042
Patented Sept. 5, 1961

2,999,042
METHOD OF PRODUCING PLASTIC SEAM
Albert A. Meister, River Forest, Ill., assignor to Bagcraft Corporation of America, Chicago, Ill., a corporation of Illinois
Filed Oct. 1, 1956, Ser. No. 613,334
2 Claims. (Cl. 154—116)

This invention relates to a plastic bag and more specifically to a heat seal joint for joining the edges of same, and a method for producing same.

In the past, there has been a problem in industry with the back seam in bags constructed of heat sealable material, such as polyethylene. While polyethylene is mentioned herein, it is not intended in any way to limit the scope of this invention to polyethylene, but rather such mention of polyethylene is made solely for the purpose of illustration. Some polyethylene bags are made of seamless tubing, but others, particularly where there is printing on the back as well as on the front, must be made of flat sheeting and when the bags are fabricated, a back seam has to be sealed. Preferably this seal is a heat seal, and typically it has been a longitudinal seal or line running through the central portion of overlapped margins of the bag material. This type of construction has created a problem in manufacturing because there is a delicate balance of heat and pressure that is required. Application time must of necessity be as short as possible if any speed in production is to be realized. If the heat and pressure are on the low side, a good seal does not result. If the heat and pressure are on the high side, the seam is "burned" and the package splits at the seam when the least bit of tensile force is applied. As used herein, "burning" refers to a weakness in the material caused by excessive temperature and characterized by a substantially lowered tensile strength. Since polyethylene and other sheet materials vary in gauge to a certain extent, the very delicate balance is difficult to maintain. The film or sheet might run along fine for a while, and then the gauge gets a little thinner and the same heat turns out to be excessive causing the bags to split. On the other hand, the gauge may get a little thicker and the same heat turns out an ineffective seam. The condition is difficult to detect and usually it becomes apparent only when the final user of the bags is attempting to fill the bags with vegetables such as onions, potatoes, carrots or any other contents.

Accordingly, I have found that if an additional interrupted seal is superimposed on the conventional longitudinal seal, or if the interrupted seal is used alone, a much superior seam or heat seal will result. The interrupted seal which I prefer is comprised of a series of spaced geometric figures having edges angularly related to the margins of the material. While any of several geometric figures are appropriate for the purpose and will function properly, one which has been found to be preferable is a V-type of figure or chevron.

Therefore, it is an object of this invention to provide a joint for heat sealable material which comprises interrupted heat seals.

It is a further object of this invention to provide a joint for heat sealable material, and a process for making such joint, comprising a longitudinal seal combined with an interrupted heat seal.

A further object is to provide a bag structure where such bag is made of heat sealable material and has a back seam joined together by an interrupted heat seal.

It is still a further object of this invention to provide a heat seal which is comprised of spaced geometric figures.

Yet another object is to provide a heat seal which is comprised of spaced V-shaped or chevron shaped figures.

Other objects, features and advantages of this invention will be apparent from the following detailed description of the attached sheet of drawings, which, by way of a single preferred embodiment, illustrates the invention.

On the drawings:
FIGURE 1 is a perspective view of a bag having a back seam;
FIGURE 2 is an enlarged view of the back seam shown in FIGURE 1;
FIGURE 3 is a cross-sectional view of a partial section shown generally along lines III—III of FIGURE 2; and
FIGURES 4 to 7 illustrate various modified forms of the heat seal pattern.

As shown on the drawings:
FIGURE 1 shows a bag of the present invention which has been made from a single sheet generally indicated at 10. This sheet may be of any suitable material such as, but not limited to, polyethylene. Any heat sealable material will of course suffice, assuming that other physical properties required for the purpose are also present. The blank 10 has a top edge or margin 10a, a bottom margin or edge 10b, and side margins 10c and 10d. The bottom margin 10b is closed as by heat sealing, to define the bottom of the bag.

It is to be noted that side margins or edges 10c and 10d are overlapped for forming the longitudinal back seam of the bag. Referring to FIGURE 2, a continuous longitudinal heat seal 11 is applied, preferably before the bottom is closed. In addition, an interrupted heat seal 12 has also been applied to the overlapped margins to further bond the margins together. The interrupted heat seal 12 is positioned transversely to the continuous longitudinal heat seal 11.

Preferably the two heat seals are applied separately. The interrupted heat seal 12 may be applied by a roll, a bar or a wire. While this illustration shows the two marginal edges to be joined as being part of the same blank, it is obvious that this seal may also be used to join separate blanks. At any event, when the two marginal edges are joined together by continuous heat seal 11 and by interrupted heat seal 12, the interface of the two marginal edges is thereby bonded together as shown in FIGURE 3.

It is now apparent that the continuous seam may be applied with the heat toward the lower side of the allowable temperature range so as to be sure that the bag does not split. The second or interrupted heat seal is normally applied with the temperature set toward the high end of the tolerance range. It is preferable to run the interrupted seal at the higher of the two temperatures because even if that sealing temperature should get a little too high so as to cause "burning," the weak point would not be a continuous line and would not spread down the whole bag. This is a well known property evidenced by the fact that many such bags are made with vent holes in them. Thus where polyethylene is used, the characteristic of polyethylene that it does not run easily (even if there is a little weak spot in the bag) is utilized in conjunction with this joint structure. Thus also there is a continuous back seam that makes a complete seal but which does not actually carry the full tension applied to the seam. The interrupted or V-seals which are transverse to the continuous seal carry much greater strain because they are not continuous and they "stitch" across a wider area of both sides of the seam. Should the interrupted seam fail due to a weak condition, there would not necessarily result a continuous tear as was the case prior to this invention.

A similar result may be accomplished with several other designs of interrupted seal. FIGURES 4, 5, 6 and 7 illustrate other patterns which may be utilized as the interrupted seal and which may be superimposed upon the continuous seal. Of course, the interval between the seals can be varied as can their location so long as the seals appear on the overlapping portion. Any one of several different geometric figures will be an improvement over the sole use of the continuous seal. Thus rectangles, squares, circles, diamonds, diagonal lines, diagonal lines from two directions, chevrons, chevrons directed from the side and the like may be used. The basic thought is that the interrupted seal should cross the vertical seal and present a reasonably broad front when viewed at right angles to the edge of the side margins. Thus FIGURE 4 illustrates how chevrons 13 may be used without the continuous longitudinal seal. In this figure there also illustrated the fact that anyone of the geometric figures may be made hollow as shown at 13a. This hollow representation is not limited to chevrons but could apply to any other type of geometric figure employed. FIGURE 5 illustrates how the geometric figure may consist of diagonals 14 and 15. Of course diagonals 14 could be used alone, diagonals 15 could be used alone, and both diagonals could be used together as illustrated. Also a continuous longitudinal seal could be superimposed upon this pattern as is shown in FIGURE 2. FIGURE 6 illustrates the use of horizontal bars 16 as the geometric figure. Of course the proportion or ratio of the length to width may be varied as may also the intervals between the bars. Again these geometric figures may be traversed by a longitudinal continuous seal. In the form of geometric figures illustrated in FIGURES 4, 5, 6 and 7, it will be noted that spaces or intervals 17 (FIGURE 6) which lie between the geometric figures and which define the interruption of same actually are unsealed portions. This type of structure may be preferable where a bag is to be ventilated. FIGURE 7 illustrates how the geometric figures may comprise circular shapes. Of course any combination of angular and circular shapes may also be used. Thus trapezoids, ellipses, semi-circles, half moons and asymmetrical configurations involving both straight and curved lines are contemplated within the meaning of the term geometrical figures as used herein.

The term "heat seal" as used herein refers to a joint made by thermal fusion together of two layers of thermoplastic sheet, and does not include joints embodying a different thermoplastic material or coating within that joint.

It will be understood that numerous modifications and variations may be effected without departing from the scope of the present invention, but it is understood that this application is to be limited only by the scope of the appended claims.

I claim as my invention:

1. A method of heat sealing together two overlapped thicknesses of film-like thermoplastic packaging material, comprising: maintaining a first heat and pressure applicator at a temperature slightly above that needed to produce thermoplastic bonding of the material; maintaining a second heat and pressure applicator at a temperature above that of the first applicator and below a critical "burning" temperature for said material; and consecutively applying each of said applicators to the overlapped portions of said material in such a manner as to define effectively a single seam, incremental portions of which have been made by only one of each of said applicators.

2. A method of heat sealing together two overlapped thicknesses of film-like thermoplastic packaging material, comprising: maintaining a first heat and pressure applicator at a temperature slightly above that needed to produce thermoplastic bonding of the material; maintaining a second heat and pressure applicator at a temperature above that of the first applicator and below a critical "burning" temperature for said material; and consecutively applying each of said applicators to the overlapped portions of said material in such a manner as to define effectively a single seam, said second applicator engaging the overlapped portions of said material only at spaced areas thereof.

References Cited in the file of this patent

UNITED STATES PATENTS

| | | |
|---|---|---|
| 1,958,455 | Ware | May 15, 1934 |
| 2,048,895 | Rosen | July 28, 1936 |
| 2,114,855 | Munson | Apr. 19, 1938 |
| 2,422,725 | Gilfillan | June 24, 1947 |
| 2,520,737 | Romeyn et al. | Aug. 29, 1950 |
| 2,522,408 | Sowter | Sept. 12, 1950 |
| 2,530,400 | Rado | Nov. 21, 1950 |
| 2,549,513 | Nicolle | Apr. 17, 1951 |
| 2,609,317 | Vogt | Sept. 2, 1952 |
| 2,653,888 | Hyman | Sept. 29, 1953 |
| 2,719,100 | Banigan | Sept. 27, 1955 |